United States Patent

[11] 3,632,429

[72] Inventors Teizo Maeda;
 Koji Kudo, both of Moriguchi, Japan
[21] Appl. No. 57,422
[22] Filed June 30, 1970
[45] Patented Jan. 4, 1972
[73] Assignee Matsushita Electric Industrial Co., Ltd.
 Osaka, Japan
[32] Priority Dec. 13, 1965
[33] Japan
[31] 40/79040
 Continuation of application Ser. No.
 601,419, Dec. 13, 1966, now abandoned.
 This application June 30, 1970, Ser. No.
 57,422

[54] METHOD FOR MAKING METAL OXIDE FILM RESISTORS
 7 Claims, 10 Drawing Figs.
[52] U.S. Cl. .................................................... 117/201,
 117/106, 118/48
[51] Int. Cl. .................................................... C23c 11/00
[50] Field of Search .......................................... 118/48, 49,
 49.1, 49.5

[56] References Cited
 OTHER REFERENCES
 Powell et al., " Vapor Plating," 1955, pages 8 to 12 relied upon.

*Primary Examiner*—Alfred L. Leavitt
*Assistant Examiner*—W. E. Ball
*Attorney*—Wenderoth, Lind & Ponack ABSTRACT: A method for making metal oxide film resistors comprising the steps of heating a solution of a mixture of stannic chloride ($SnCl_4 \cdot nH_2O$) and antimony chloride to a temperature of 100° to 250° C. in a uniform low-temperature zone maintained at said temperature, thereby generating vapors of said mixture, heating resistor substrate bodies to a temperature of 550° to 850° C. in a uniform high-temperature zone maintained at said last-named temperature, said zones being spaced from each other and being directly interconnected by an interposed temperature transition zone, flowing the vaporous mixture by means of carrier gas from said low-temperature zone to said high-temperature zone, whereby said substrate bodies are coated, at the surface thereof, with deposited metal oxide film consisting of antimony oxide doped tin oxide.

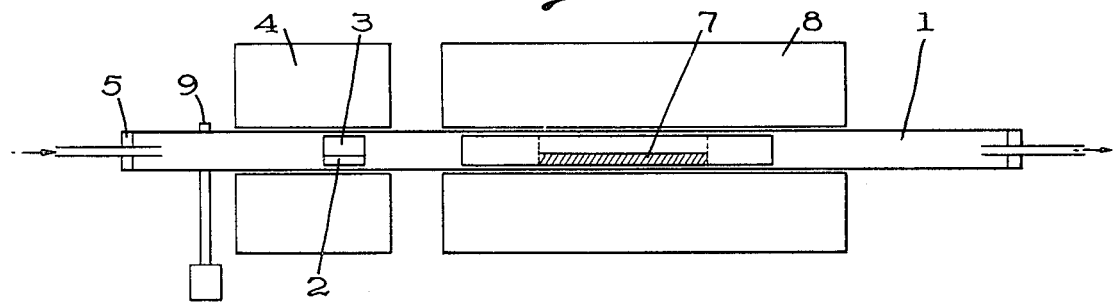
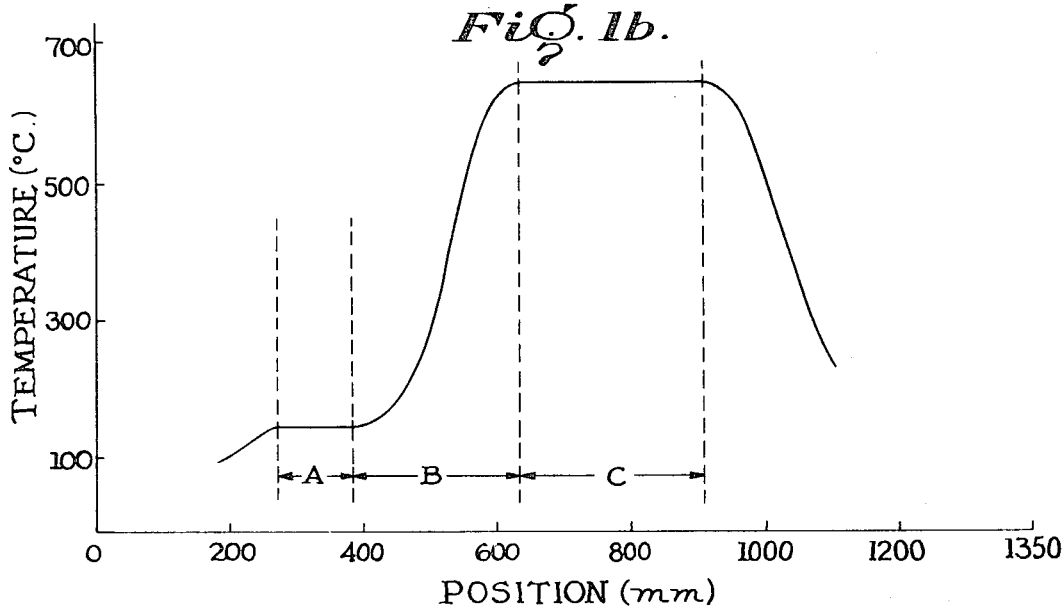
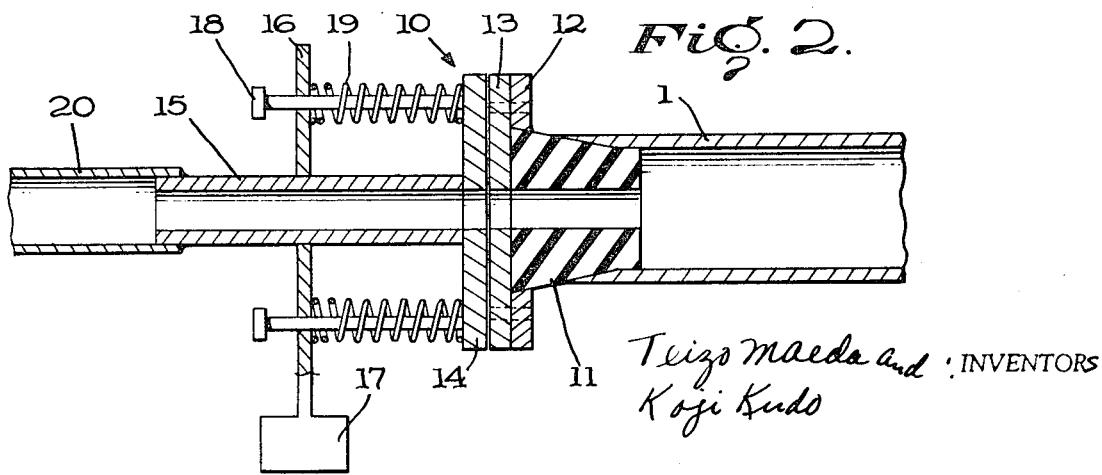

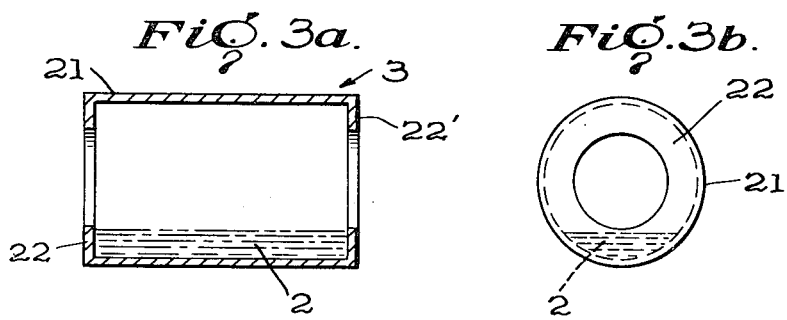
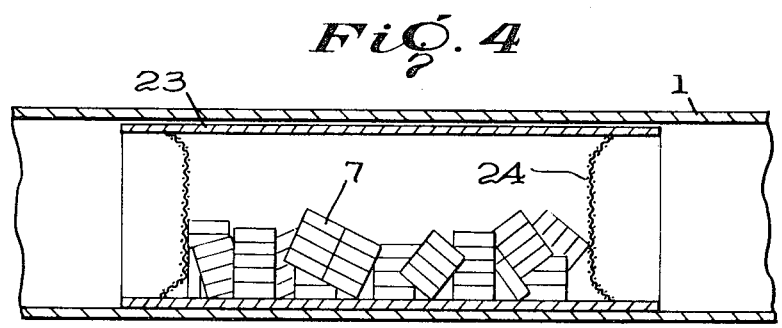
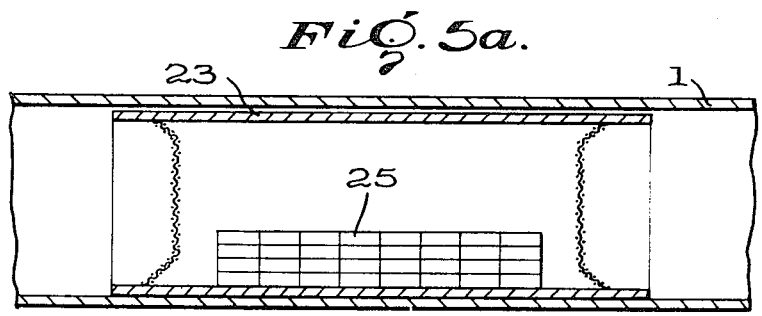

METHOD FOR MAKING METAL OXIDE FILM RESISTORS

This application is a continuation of application Ser. No. 601,419, filed Dec. 13, 1966, now abandoned.

This invention relates to a method for making metal oxide film resistors consisting of tin oxide doped with antimony oxide, and more particularly to a method which is characterized by pyrolytic deposition of a mixture of stannic chloride and antimony chloride in the vapor phase.

Metal oxide film resistors consisting of tin oxide doped with antimony oxide have been widely used because they have superior electrical properties in temperature coefficient of resistivity, high stability with respect to heat, humidity, and loading time, and a close tolerance in the resultant electrical resistivity. The most common method for making the resistors is known to be a spray method in which heated substrates are coated with tin oxide film doped with antimony oxide by spraying a solution of stannic chloride and antimony chloride in solvent such as methanol and hydrochloric acid. This method, however, is bound up with the disadvantage that a large amount of solvent is required and that solution waste is high. In addition, it is difficult by this method to make resistors of a small size having a close tolerance in electrical resistivity because of the difficulty in holding substrates of a small size during spraying, and because there is a great decrease in temperature at the surface of the substrates when the solution is applied thereto by spraying.

An object of this invention is to provide a mass production method for making tin oxide resistors doped with antimony oxide which is adapted for substrates of a small size.

A further object of this invention is to provide a method of making tin oxide film resistors doped with antimony oxide, which is characterized by low-cost manufacturing steps and elimination of high waste of solution.

Another object of this invention is to provide a method for making metal oxide film resistors which have a close tolerance in electrical resistivity and in temperature coefficient.

These and other objects will become apparent upon consideration of following description taken together with the accompanying drawings in which:

FIG. 1a is a diagrammatic showing of pyrolytic deposition installation in accordance with the invention.

FIG. 1b is a graph illustrating the temperature distribution of the heating apparatus and heating zones or regions in accordance with FIG. 1a.

FIG. 2 is a cross-sectional view of closure means.

FIGS. 3a and 3b are cross-sectional views, respectively parallel and perpendicular to an axis thereof, of a container for a solution of stannic chloride and antimony chloride in accordance with the invention.

FIG. 4 is a cross-sectional view of a high-temperature zone or region provided with substrate bodies in a chemically resistant tube.

FIG. 5a is a cross-sectional view of a high-temperature zone or region provided with substrate tubes which are aligned by bars and stacked together in a chemically resistant tube.

FIG. 5b is a cross-sectional view of aligned substrate tubes on an inert metal rod.

Figure 6A:
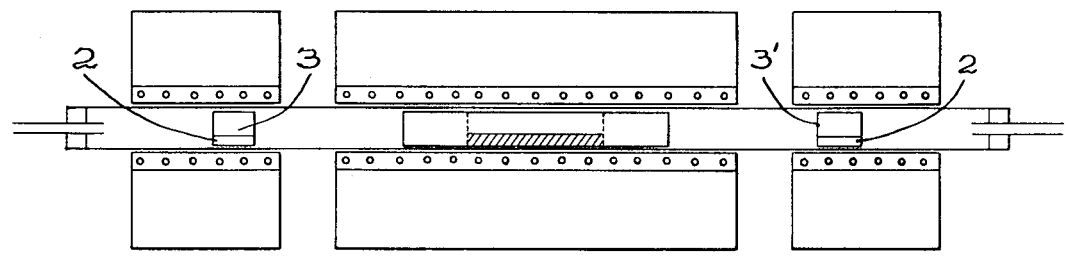
FIG. 6a is an alternative embodiment of pyrolitic deposition apparatus.

According to the present invention, metal oxide film resistors are manufactured by a method comprising heating a mixture of stannic halide such as chloride, fluoride or bromide and antimony halide such as chloride, fluoride or bromide at a temperature of 100° to 250° C. so as to generate a vapor thereof, transferring said vapor, by means of a flowing carrier gas, to substrate bodies which are heated at a temperature of 550° to 850° c., and chemically depositing said vapor on the surface of said substrate bodies so as to form a resistance film consisting of tin oxide doped with antimony oxide. Preferable compounds for said mixture are stannic chloride ($SnCl_4 \cdot nH_2O$) and antimony chloride ($SbCl_3$), said stannic chloride containing 3 or 5 moles of water of crystallization. The method according to the invention is superior, in making metal oxide film resistors of a small size, to the prior method comprising spraying a solution of stannic chloride and antimony chloride in a per se well-known solvent onto the surface of substrate bodies heated at a temperature of 550° to 850° C.

Referring to FIG. 1, which shows the general relationship of parts according to one embodiment of apparatus according to the invention, reference character 1 designates a refractory tube which is inert to the vapor of stannic chloride and antimony chloride and is gastight. Said refractory tube is made of, for example, quartz, titanium or stainless steel. Among these materials, titanium is the best material because metal oxide film deposited on the inside wall of titanium tube is easily taken off without remarkable damage to the titanium tube when the film becomes thick. Stainless steel is not as resistant to the vapor, and a quartz tube is sometimes broken due to a difference of thermal expansions of the quartz tube and metal oxide film adherent to the inside wall thereof. A mixture of stannic chloride and antimony chloride 2 is placed in a container 3 (cf. FIGS. 3a and 3b) and is heated at a temperature of 100° to 250° C. by a heating means 4 so that said mixture generates a vapor thereof which is thus formed into aerosol. A carrier gas is passed from an inlet 5 to an outlet 6 in order to transfer generated aerosol to stacked substrate bodies 7 (cf. FIGS. 4 and 5) which are spaced from said mixture and are heated at a temperature of 550° to 850° C. by a heating means 8.

The substrate bodies must be made of materials having a high electric resistance and a high resistance to heat and said vapor. Operable materials are glass and ceramics having a rod form or a tube form. The transferred aerosol chemically pyrolyzes on the surface of said substrate bodies and forms a resistance film consisting of tin oxide doped with antimony oxide on said surface.

It is important that each of said stacked substrate bodies be uniformly coated with said resistance film for producing metal oxide film resistors in a close tolerance of electrical properties. Uniform resistance films can be obtained by rotating said substrate bodies 7 during the chemical deposition. The rotation of said substrate bodies can be achieved by rotating said refractory tube 1 by any rotating per se conventional means such as rotating belt or chain (indicated diagrammatically at 9 in FIG. 1).

Stopper or closure means for inlet 5 and outlet 6 are constructed in such a way that the gas pipe attached externally to the refractory tube 1 does not rotate with the rotation of the refractory tube. Referring to FIG. 2, reference character 10 designates, as a whole, a closure means according to the invention, 11 being a rubber stopper having a central longitudinal bore which serves as a carrier gas path. Said rubber stopper 11 is fixed in metal ring disc 12 as shown and is also fixed to correspondingly centrally bored metal disc 13. Said rubber stopper 11 is inserted into the aforesaid refractory tube 1 to rotate therewith. The free surface of said metal disc 13 is polished and jointed airtightly to a polished surface of another similarly centrally bored metal disc 14. Said metal disc 14 is connected to a pipe 15 to form part of the carrier gas path. The pipe 15 is supported by a holder 16 which is fixed on a stand 17. Said holder is provided with four supports 18, each of which is provided with a spring 19 to press the metal disc 14 against the disc 13. Said refractory tube 1 is pressed from both sides, i.e. at each end thereof by such a closure means, whereby the tube may be supplied with carrier gas from inlet 5 through outlet 6 during rotation of the tube 1 but without rotation of the gas supply and discharge assemblies. In this way the metal disc 13 connected firmly to said refractory tube 1 can be rotated while keeping a gastight joint against the stationary metal disc 14. A flexible rubber pipe 20 for the carrier gas path is provided at each end.

Any suitable and per se conventional heating means can be employed for producing a temperature distribution as defined in FIG. 1b wherein the low-temperature zone or region A is a region for heating said mixture 2 at a temperature of 100° to 250° C. and the high-temperature zone or region C is a region for heating the substrate bodies at 550° to 850° C. It is preferable that the transition region B between said low-temperature region A and said high-temperature region C be as short as possible. In practice, the length of said transition zone or region B is a distance equal to two to five times the outer diameter of said refractory tube 1. Therefore, it is preferable to use heating apparatus constructed from two furnaces which are spaced from each other by a distance equal to 0.8 to five times the outside diameter of said refractory tube.

Said temperature distribution can be achieved by two electric furnaces provided with, for example, a winding heating wire, such as nichrome wire. A single furnace having a temperature distribution as defined in FIG. 1b is however also operable for use as a heating apparatus according to the invention.

It is necessary for facilitating the rotation of said refractory tube 1 that said container 3 (FIGS. 3a and 3b) be of a specified form, because said mixture 2 is in a liquid state at the temperature of 100° to 250° C. Referring to FIGS. 3a and 3b, reference character 3 designates, as a whole, a container including said mixture 2 therein in accordance with the invention, said container being constituted by a tube 21 which is made of material inert to said mixture 2. The tube 21 is provided with annular flanges 22 and 22' providing end walls for preventing said mixture in a liquid state from leaking out of said tube 21 during rotation.

Said container can be made of any material having a resistance to heat and to said solution. For example, glass, quartz, ceramics or titanium are operable. Said rings 22 and 22' are connected watertightly to said tube 21 in any per se conventional and suitable method, e.g. by using welding or by fusing together when the two are of glass. The container 3 having said mixture is securely placed in said refractory tube 1 and rotates therewith during the rotation of said refractory tube 1. It is preferable that the outer diameter of said container is in a ration of 0.7 to 0.98 with respect to the inner diameter of said refractory tube 1.

Said mixture according to the invention comprises 99.9 to 80.0 mol percent of stannic chloride ($SnCl_4 \cdot 5H_2O$) and 0.1 to 20.0 mol percent of antimony chloride ($SbCl_3$). According to the prior spraying method, said mixture is required to be formed into a solution having a fluidity suitable for the spraying operation. However, the present invention does not require the addition of a solvent to said mixture for controlling the fluidity. A mixture of $SnCl_4 \cdot 5H_2O$ and $SbCl_3$ without any additional solvent can produce a closer tolerance in the electrical resistivity of the resultant resistors than a mixture with a large amount of added solvent does. The mixture according to the invention is heated at about 70° C. while being stirred so as to form a homogeneous melt. The melt so produced is kept at about 40° C. until it is placed in the low-temperature region. Said mixture may, if desired, have incorporated therein a small amount of solvent (methanol, ethanol, propanol or hydrochloric acid of 0.5 to 5.0 normality). Operable amount of said solvent is 1 to 60 milliliters per 100 grams of said stannic chloride ($SnCl_4 \cdot 5H_2O$).

Said carrier gas comprises an oxidizing gas such as air, oxygen, or argon containing at least 1 volume percent of oxygen. The flow rate of said carrier gas is important for achieving uniform resistance films which result in a close tolerance of electrical properties of the resultant resistors. An operable flow rate varies with the normal cross-sectional area of the refractory tube 1 and is 0.2 to 2.0 liters/minute per unit area of said cross-sectional area. It is preferable that the carrier gas be preheated by flowing through a metal pipe which is immersed in an oil bath heated at the same temperature as the low-temperature region.

The vapor of stannic chloride and antimony chloride is deposited on the surface of the substrate bodies heated at a temperature of 550° to 850° C. and is converted into a resistance film consisting of tin oxide doped with antimony oxide by oxygen and water included in said carrier gas in association with the vapor of said solvent such as methanol, ethanol, propanol or hydrochloric acid.

Referring to FIG. 4, this is intended to show that said substrate bodies 7 can be randomly stacked in a chemically durable tube 23 having, at each end thereof, a cover 24 made of wire mesh of a high resistance to temperature and generated vapor of said mixture and then are heated at said high-temperature region of 550° to 850° C. while rotating with the rotation of said refractory tube 1. Said chemically durable tube is filled with said substrate bodies up to less than half the volume thereof so as to allow each of said substrate bodies 7 to rotate freely. Said wire mesh may be formed of, for example, stainless steel wire or titanium wire.

Referring to FIGS. 5a and 5b, another advantageous method for achieving uniform resistance films is such that said substrate bodies are made of tubes 25 which are aligned by being inserted onto long bars 26 so as to form a substrate tubes train. Said long bars are required to have a length less than that of said high-temperature region, and to be made of materials durable to heat and generated vapor. Stainless steel and titanium can be used for a long bar 26. Said long bar 26 is thickened at one end 27 thereof for holding substrate tubes 25 and is provided, at the other end thereof, with any holder means 28 for fixing the inserted substrate tubes, as shown in FIG. 5b. Operable holder means is a threaded nut or a collet ring.

A resistance film can be improved in the uniformity thereof by flowing carrier gas initially from one side and then alternatively from the opposite side. Referring to FIG. 6a, wherein the same reference numbers designate the same components as those of FIG. 1, the high-temperature zone or region C is followed by another low-temperature zone or region E in the same condition as the first low-temperature zone or region A. The transition zone or region D is also in the same condition as the transition zone or region B. Initially the container 3 provided with said mixture 2 is stalled in said low-temperature region A and said carrier gas flows from the left side to substrate bodies at said high-temperature region C so as to deposit a resistance film on the surface of such substrate bodies. Then, said container 3 is taken from the low-temperature region A, and another container 3 provided with mixture 2 is placed at the other low-temperature region E. Said carrier gas flows from the right side to substrate bodies at said high-temperature region C so as to deposit a resistance film on the surface of substrate bodies in region E. The alternative flowing of carrier gas can facilitate forming uniform resistance film regardless of the position of said substrates at the high-temperature region C.

The following examples illustrate presently preferred embodiments of the invention, but should not be construed as limitative.

EXAMPLE 1

Sixty ceramic rods, 4 mm. in diameter and 14 mm. in length, are placed in a uniform high-temperature zone of a refractory tube, 35 mm. in diameter and 1,000 mm. in length, and heated for 8 minutes at a temperature of 650° C. Subsequently, a glass container provided with 2 ml. of a solution comprising 93.5 mol percentage of $SnCl_4 \cdot 5H_2O$ and 6.5 mol percentage of $SbCl_3$ is placed in a uniform low-temperature zone of the refractory tube and heated at a temperature of 150° C. so as to generate an aerosol having tin chloride and antimony chloride. Said container is of a tube shape as defined in FIG. 3 and has an outside size of 45 mm. in length and 35 mm. in diameter. The inner hole of the ring is 21 mm. in diameter. The refractory tube is rotated at a rate of 25 revolutions per minute about its horizontal axis. Subsequently, air is caused to flow for 10 minutes at a rate of 8 liters/min. from the low-temperature zone to the high-temperature zone so as to transfer the aerosol to said high-temperature zone. The aerosol pyrolyzes on the surface of said ceramic rods and forms film consisting of tin oxide doped with antimony oxide. The resultant resistance films have a surface resistivity of about 12 $\Omega$ and a temperature coefficient of resistivity of ±250 parts per million per °C.

EXAMPLE 2

Two thousand ceramic rods, 3 mm. in diameter and 11 mm. in length, are placed in a uniform high-temperature region of a refractory tube, 55 mm. in diameter and 1,800 mm. in length, and heated for 30 minutes at a temperature of 660° C. A glass container having the shape defined in FIG. 3 is provided with 30 ml. of a solution consisting of 100 g. of $SnCl_4 \cdot 5H_2O$, 6.43 g. of $SbCl_3$, and 10 ml. of 1.2 N hydrochloric acid, is placed in the uniform low-temperature zone of the refractory tube and heated at a temperature of 200° C. so as to generate an aerosol having tin chloride, antimony chloride and water. The refractory tube is rotated at a rate of 30 revolutions per minute around its horizontal axis. Subsequently, the air is caused to flow for 25 minutes at a rate of 15 liters/min. from the low-temperature zone to the high-temperature region so as to transfer the aerosol. The deposited films have a surface resistivity of about 12 $\Omega$ and a temperature coefficient of resistivity of ±250 parts per million per °C.

EXAMPLE 3

Sixty ceramic rods, 4 mm. in diameter and 14 in length, are treated in a manner similar to that described for example 1. Two ml. of solution consisting of 100 g. of $SnCl_4 \cdot 5H_2O$, 6.43 g. of $SbCl_3$ and 10 ml. of $CH_3OH$ is contained in a glass container having a shape defined in FIG. 3 and heated in the same way as in example 1. The air flows for 6 minutes at a rate of 8 liters/min. The deposited film has a surface resistivity of about 54 $\Omega$ and a temperature coefficient of resistivity of ±250 parts per million per °C.

EXAMPLE 4

Sixty-three ceramic tubes, 4 mm. in outside diameter, 1 mm. in inside diameter and 14 mm. length, are aligned by being inserted onto a titanium rod of 1 mm. diameter. These aligned tubes are stacked together in a high-temperature zone of a refractory tube and heated at 660° C. for 8 minutes. Two ml. of solution having the same composition as that of example 3 placed in a low-temperature zone and is heated at 150° C. The air flows for 10 minutes at a rate of 8 liters/min. The deposited film has a surface resistivity of about 118 $\Omega$ and a temperature coefficient of resistivity of ±200 parts per million per °C.

EXAMPLE 5

Figure 6B:
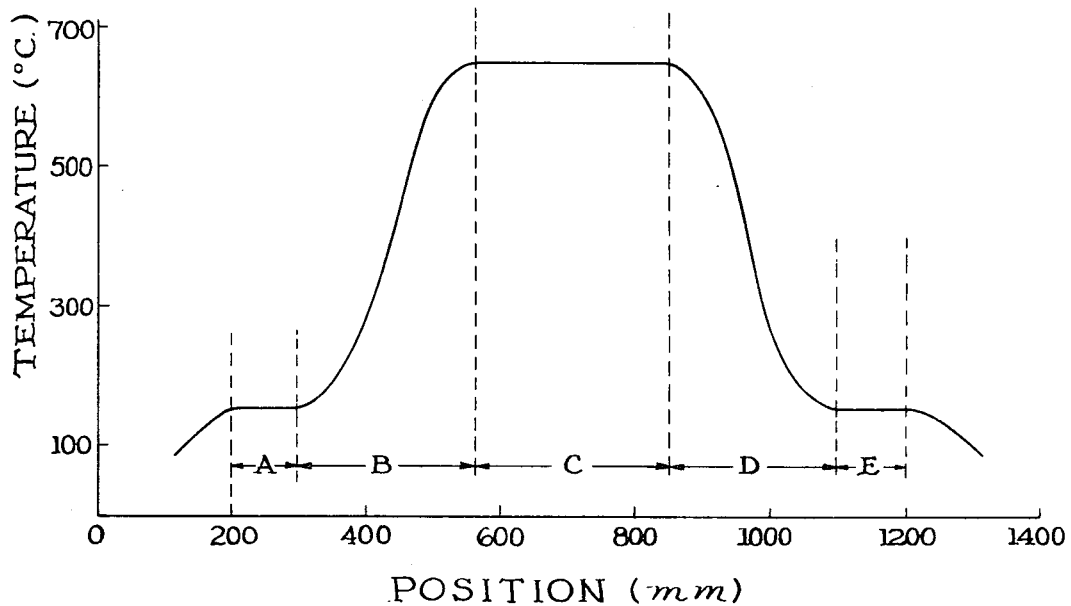
FIG. 6b is a graph illustrating the temperature distribution of the said embodiment of heating apparatus.

This example illustrates manufacturing steps characterized by an alternative flowing of air from both sides as shown in FIG. 6. Two hundred ceramic rods, 4 mm. in diameter and 14 mm. in length, are placed in a uniform high-temperature zone of a refractory tube of 40 mm. diameter and 1,300 mm. length and heated for 15 minutes at a temperature of 650° C. A glass container as defined in the preceding examples is provided with 2 ml. of solution comprising 100 g. of $SnCl_4 \cdot 5H_2O$, 7.2 g. of $SbCl_3$ and 10 ml. of $CH_3OH$, placed in the left-hand side uniform low-temperature region of the refractory tube and heated at a temperature of 150° C. so as to generate an aerosol having tin chloride, antimony chloride and water. The refractory tube is rotated at a rate of 30 revolutions per minute around a horizontal axis of said refractory tube. The air flows for 10 minutes at a rate of 15 liters/min. from the low-temperature zone to a high-temperature zone so as to transfer the aerosol. Subsequently, the container is taken out of the refractory tube and another container is provided with the same solution, paced in the right-hand side uniform low-temperature zone of the refractory tube and heated at a temperature of 150° C. Again, the air flows for 10 minutes at a rate of 15 liters/min. in the direction opposite that of the first step. The deposited film has surface resistivity of about 10 $\Omega$ and temperature coefficient of resistivity of ±100 parts per million per °C.

In the preceding examples, g. stands for grams, ml. for milliliters, and mm. for millimeters.

What is claimed is:

1. A method for making metal oxide film resistors comprising the steps of heating a solution of a mixture of $SnCl_4 \cdot nH_2O$, wherein $n$ in an integer of 3 or 5 and antimony chloride to a temperature of 100° to 250° C. in a uniform low-temperature zone maintained at said temperature, thereby generating vapors of said mixture, heating resistor substrate bodies to a temperature of 550° to 850° C. in a uniform high-temperature zone maintained at said last-named temperature, said zones being located in a rotating tube and being spaced from each other by an interposed temperature transition zone, flowing the vaporous mixture by means of carrier gas from said low-temperature zone to said high-temperature region, whereby said substrate bodies are coated, at the surface thereof, with deposited metal oxide oxide film consisting of antimony oxide doped tin oxide.

2. A method for making metal oxide film resistors according to claim 1, wherein said interposed temperature transition zone has a distance equal to two to five times of the outside diameter thereof.

3. A method for making metal oxide film resistors according to claim 1, wherein said solution comprises 99.9 to 80.0 mol percentage of stannic chloride $SnCl_4 \cdot 5H_2O$ and 0.1 to 20.0 mol percentage of antimony chloride $SbCl_3$.

4. A method for making metal oxide film resistors according to claim 1, wherein said carrier gas contains at least 1 volume percent of oxygen.

5. A method for making metal oxide film resistors according to claim 2, wherein said carrier gas has a flowing rate of 0.2 to 2 liters/min. with respect to a unit area of normal cross-sectional area of said zones.

6. A method for making metal oxide film resistors according to claim 2 wherein one of said heating zones which is a low-temperature zone is provided with an open-ended cylindrical container for holding a solution of a mixture of stannic chloride and antimony chloride, each end of said cylindrical container being equipped with an annular flange having a hole in the center thereof, permitting said carrier gas to flow through said cylindrical container and preventing leakage of said solution, the outer diameter of said cylindrical container being in a ratio of 0.98 to 0.7 with respect to the inner diameter thereof.

7. A method for making metal oxide film resistors defined in claim 2, wherein said substrate bodies are tubes which are aligned in trains on long bars by inserting said long bars into said tubes having a length less than that of said high-temperature zone so as to form substrate tube trains, said trains being stacked together in the said high-temperature zone so that said trains rotate and move around in the stack.

* * * * *